(12) United States Patent
Zhang

(10) Patent No.: US 11,155,449 B2
(45) Date of Patent: Oct. 26, 2021

(54) CARGO LOADING/UNLOADING DEVICE FOR DRONES

(71) Applicant: Aaron Zhang, Los Angeles, CA (US)

(72) Inventor: Aaron Zhang, Los Angeles, CA (US)

( * ) Notice: Subject to any disclaimer, the term of this patent is extended or adjusted under 35 U.S.C. 154(b) by 83 days.

(21) Appl. No.: 16/458,272

(22) Filed: Jul. 1, 2019

(65) Prior Publication Data

US 2021/0002107 A1    Jan. 7, 2021

(51) Int. Cl.
| | |
|---|---|
| *B66D 1/14* | (2006.01) |
| *F16D 1/076* | (2006.01) |
| *B64D 9/00* | (2006.01) |
| *B66D 1/12* | (2006.01) |
| *F16D 11/10* | (2006.01) |
| *B64C 39/02* | (2006.01) |

(52) U.S. Cl.
CPC .............. *B66D 1/14* (2013.01); *B64D 9/00* (2013.01); *B66D 1/12* (2013.01); *F16D 1/076* (2013.01); *F16D 11/10* (2013.01); *B64C 39/02* (2013.01); *B64C 2201/128* (2013.01); *B66D 2700/0141* (2013.01); *B66D 2700/07* (2013.01)

(58) Field of Classification Search
CPC ........ B66D 1/12; B66D 1/14; B66D 2700/07; B66D 2700/0141; B64D 9/00; B64C 39/02; B64C 2201/128; F16D 1/076; F16D 11/10
See application file for complete search history.

(56) References Cited

U.S. PATENT DOCUMENTS

| | | | |
|---|---|---|---|
| 7,270,312 B1* | 9/2007 | Phipps | B66D 1/22 254/278 |
| 7,891,641 B1* | 2/2011 | Miller | B66D 1/16 254/346 |
| 9,051,160 B2* | 6/2015 | Zheng | B66D 1/14 |
| 9,359,045 B2* | 6/2016 | Nam | B63B 21/16 |
| 10,112,811 B2* | 10/2018 | Lautwein | B66D 5/06 |
| 10,766,749 B2* | 9/2020 | Fretz | B66D 1/22 |
| 2008/0140289 A1* | 6/2008 | Gross | B66D 1/58 701/50 |
| 2013/0056694 A1* | 3/2013 | Wilkins | B66D 5/00 254/342 |
| 2016/0068376 A1* | 3/2016 | Fretz | B66D 3/18 254/219 |
| 2017/0305729 A1* | 10/2017 | Lautwein | B66D 1/12 |
| 2018/0141790 A1* | 5/2018 | Paal | B66C 19/007 |

* cited by examiner

*Primary Examiner* — Michael E Gallion
(74) *Attorney, Agent, or Firm* — Wang Law Firm, Inc.

(57) ABSTRACT

A drone loading/unloading device includes an electric reel selectively movable for releasing/winding a cable adapted to be wound around the electric reel. A driver is operably connected to the electric reel to selectively drive the electric reel to reciprocally move from a locked position and an unlocked position and a buffer is mounted between the driver and the electric reel such that buffering effect is provided to the electric reel when moved from an unlocked position to a locked position.

13 Claims, 6 Drawing Sheets

CARGO LOADING/UNLOADING DEVICE FOR DRONES

BACKGROUND OF THE INVENTION

1. Field of the Invention

The preferred embodiment(s) as well as examples listed in the description is related to a cargo loading/unloading device for drones and, more particularly to a loading/unloading device having a first driver to control rotation of a reel for picking up a load, a first locking element to stop movement of the reel, a second locking element to limit the movement of the reel, a second driver to linearly move the reel to allow the reel to selectively be locked by the first locking element, and a buffer providing a buffering effect to the second locking device when activated.

2. Description of the Related Art

Ever since the drone is introduced to the market, people start thinking the applications thereof. Fields such as entertainment, surveillance or transportation . . . etc. are various applications for drones. Furthermore, since the drone is compact in size, lightweight, easy maneuverability and ecofriendly, more and more attentions are focused on how to make the drone even more durable and reliable for a prolonged period of time.

Generally speaking, when the drone is used in transportation, an electric reel is used to control the cable to load/unload the cargo. When reaching the designated area, the electric reel onboard the drone releases the cable to unload the cargo or rewind the cable to load the cargo. This load/unload mechanism purely depends on the functioning of the electric reel, which consumes large amount of electricity and relies on the operation of the electric reel considerably. That is, once the electric reel is malfunctioned due to power failure, mechanical problems or other factors, the drone is then unable to fulfill the designated task.

Further, landing of the drone in a populated area where buildings are densely situated is a great risk for the drone might easily have scratches or be destroyed by the protruding parts of the buildings. Since landing causes great risks to the drone, using cables to load and unload the cargo seems a great choice in the metropolitan area if the designated recipient is in good faith. That is, when the cable is unwound from the electric reel to unload the cargo, bystanders or passersby may deliberately pull the cable trying to play with the drone and inevitably damaging the drone.

SUMMARY OF THE INVENTION

The primary objective of the preferred embodiment of the present invention is to provide a drone cargo loading/unloading device to safely protect the drone. The cargo loading/unloading device has an electric reel, a first driver to drive the electric reel, a first locking element selectively locking the electric reel and the first driver, a second driver selectively move the electric reel linearly between a locked status and a free-rotation status, a second locking element selectively locking the electric reel to disengage the electric reel from the free-rotation status and a buffering element providing a buffer to the second locking element when the electric reel is disengaged from the free-rotation status and moved into the locked status by the second driver.

Still another objective of the preferred embodiment of the present invention is that the first locking element and the second locking element are respectively two pairs of gears interlocking together when needed. It is also noted that the gears of each pair of gears are slanted.

A still further objective of the preferred embodiment of the present invention is that the electric reel has a first rotation axle securely and axially received inside the electric reel and having a first end extending out therefrom to selectively contact the first driver and a second end securely connected to the buffer and a second rotation axle one end of which is securely connected to the buffer and the other end of which is connected to a linking rod rotatably extending out from the second driver to allow the second driver to move the electric reel linearly.

DETAILED DESCRIPTION OF THE PREFERRED EMBODIMENT

Figure 1:
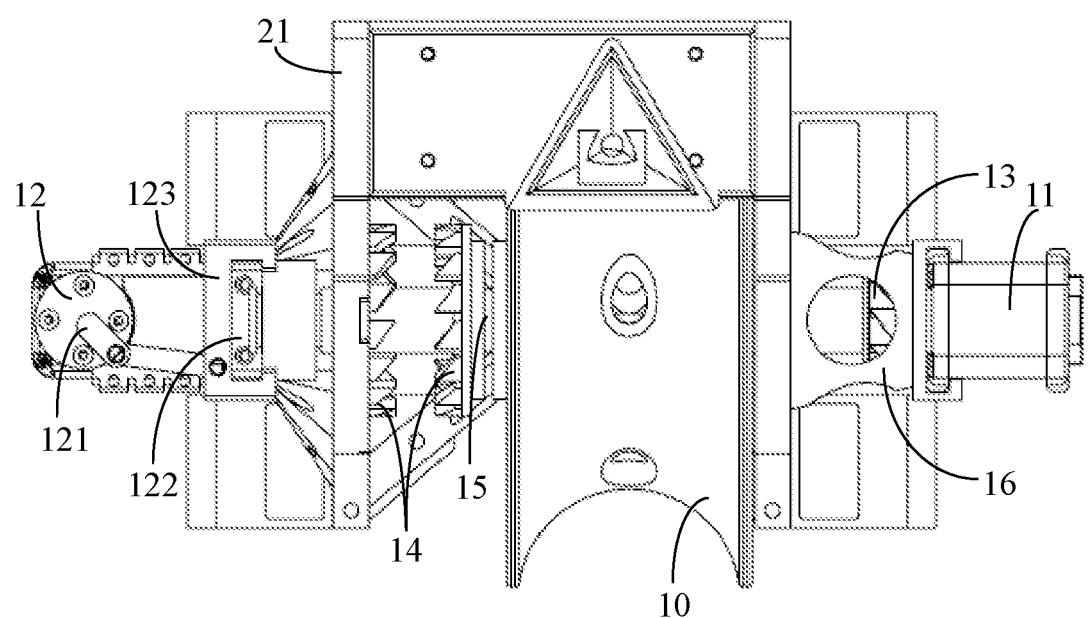
FIG. 1 is a schematic side view showing the cargo loading/unloading device for a drone in a first status of the preferred embodiment of the invention.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

The following description describes a preferred embodiment of a cargo loading/unloading device for a drone, in which the device has a buffer installed between the first rotation axle and a second rotation axle to providing a buffering effect to the second locking element to protect the second locking element from damage.

Figure 2:
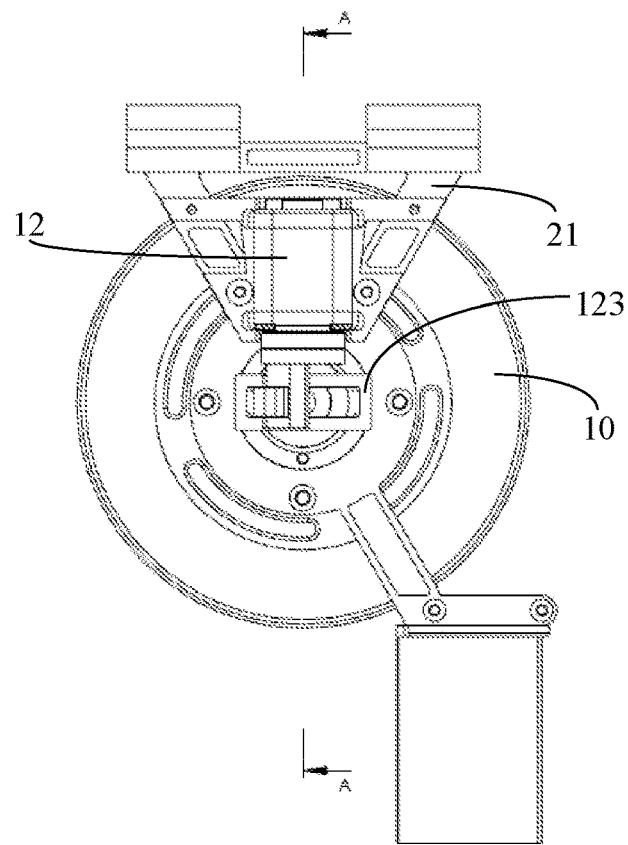
FIG. 2 is a side plan view of the cargo loading/unloading device for a drone of the preferred embodiment of the present invention.
Figure 3:
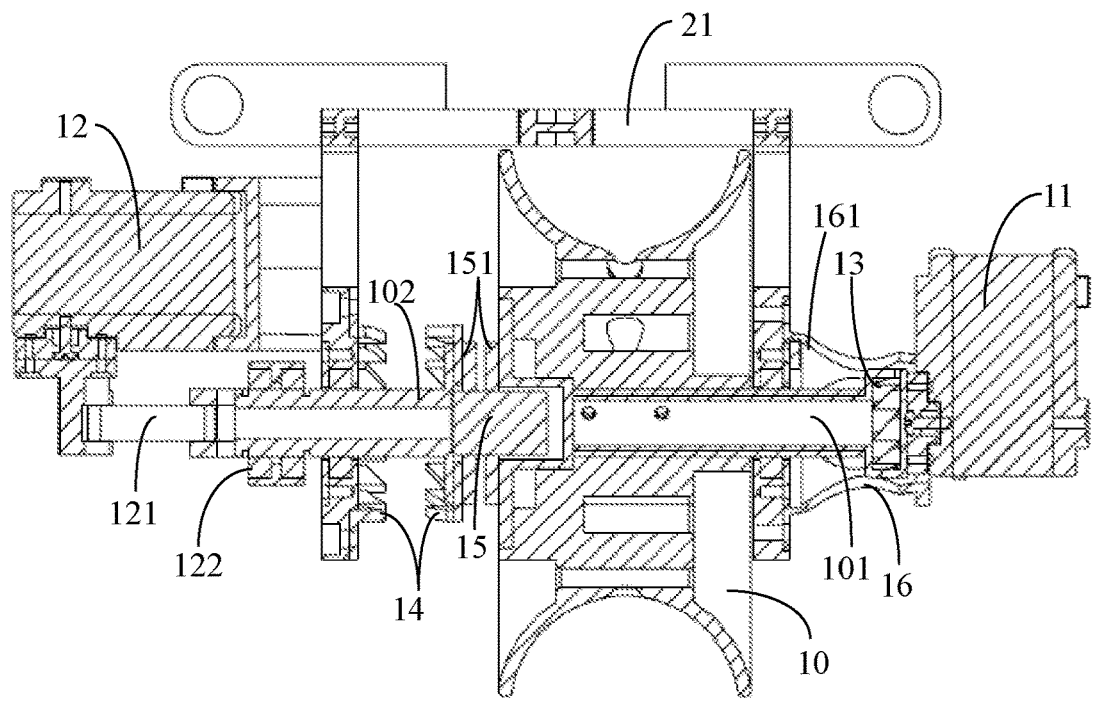
FIG. 3 is a cross sectional view of the cargo loading/unloading device for a drone by line A-A in FIG. 2.

With reference to FIGS. 1, 2 and 3, the preferred embodiment of the present invention provides a cargo loading/unloading device for a drone having an electric reel 10, a first driver 11, e.g. motor, selectively connected to the electric reel 10 to rotate the electric reel 10 only in one direction, a second driver 12, e.g. motor, selectively connected to the electric reel 10 to linearly move the electric reel 10, a first locking element 13 mounted between the first driver 11 and the electric reel 10 to lock the first driver and the electric reel 10 to allow the first driver 11 to rotate the electric reel 10 and a second locking element 14 mounted between the electric reel 10 and the second driver 12 to allow the second driver 12 to linearly move the electric reel 10.

Figure 4:
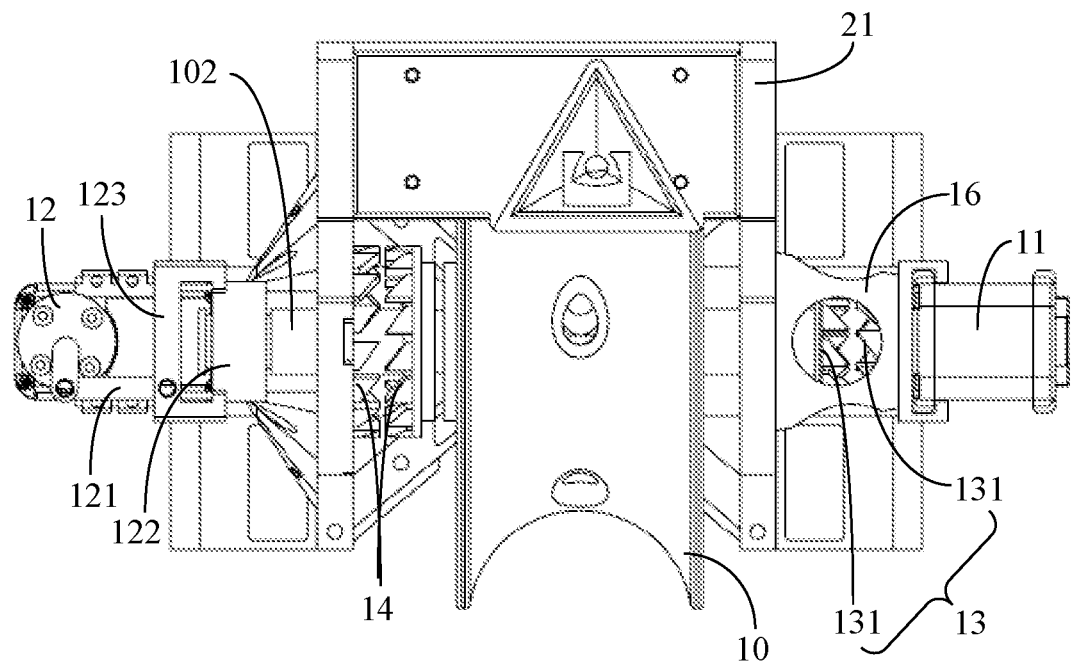
FIG. 4 is a schematic view showing that the cargo loading/unloading device for a drone in a second status.

From the drawings described above, it is appreciated the first driver 11 may be a general driver and the electrical reel 10 has a first rotation axle 101 axially and securely received in the electric reel 10. The first rotation axle 101 has a first end integrally extending out of the electric reel 10 and provided with a portion of the first locking element 13. That is, the first locking element 13 has two sets of gears 131 (as shown in FIG. 4) one of which is integrally formed on the first end of the first rotation axle 101 and the other half of which is integrally formed on a side of the first driver 11. Both gears are slanted in a predetermined angle such that when the two halves of gears are matched with one another, none of which are damaged. When the two sets of gears 131 are matched with one another, the first driver 11 is able to drive the electric reel 10 to rotate in only one direction. A protection sleeve 16 is provided on the outside of the first locking element 13 and has a tapered guiding passage 161 defined inside the protection sleeve 16 to guide the matching of the two sets of gears 131. A second rotation axle 102 is provided and has a first end connected to the first rotation axle 101 and a second end connected to a linking rod 121 extending out from the second driver 12. In order to secure the connection and the rotation between the first rotation axle 101 and the second rotation axle 102, a stability bracket 21 is provided and has two oppositely defined holes (not numbered) respectively formed in two opposed side walls of the stability bracket 21 to allow the first rotation axle 101 and the second rotation axle 102 to extend there through and to provide support thereto. It is noted that a distance between the two opposed side walls of the stability bracket 21 is larger than that of the axial length of the electric reel 10 so that the electric reel 10 has sufficient space for linear movement when required.

With reference to FIGS. 1 and 3, it is appreciated that when the electric reel 10 is wound with a cable and there is nothing to stop the electric reel 10 from free rotation due to gravity, the free rotation direction of the electric reel 10 is opposite to the direction of the electric reel 10 when driven by the first driver 11. That is, the first driver 11 only drives the electric reel 10 to retrieve the cable after being released. With this design, the first driver 11 only functions when the cable is to be retrieved and the battery onboard the drone is saved for prolonged flight. Also, when the first locking element 13 is energized to lock the electric reel 10 with the first driver 11, the first driver 11 is able to drive the electric reel 10 to start retrieving the cable and when the first locking element 13 is de-energized, the electric reel 10, no longer connected to the first driver 11, stops rotation and cable retrieving process is stopped.

Figure 6:
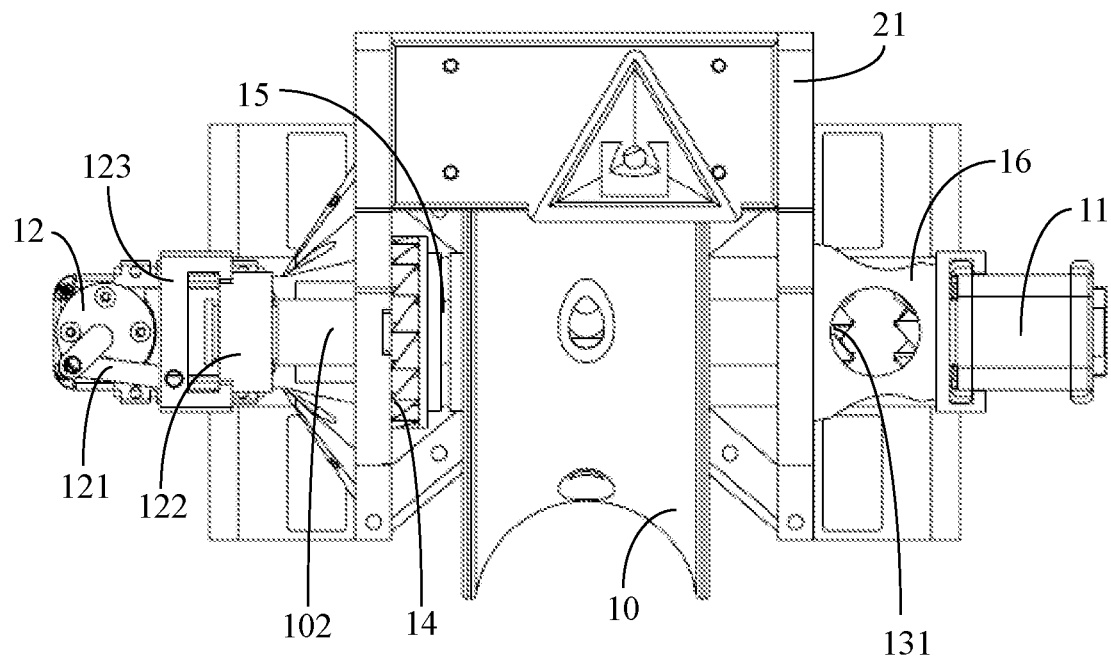
FIG. 6 is a schematic view showing that the cargo loading/unloading device for a drone of the preferred embodiment of the present invention in a third status.
Figure 7:
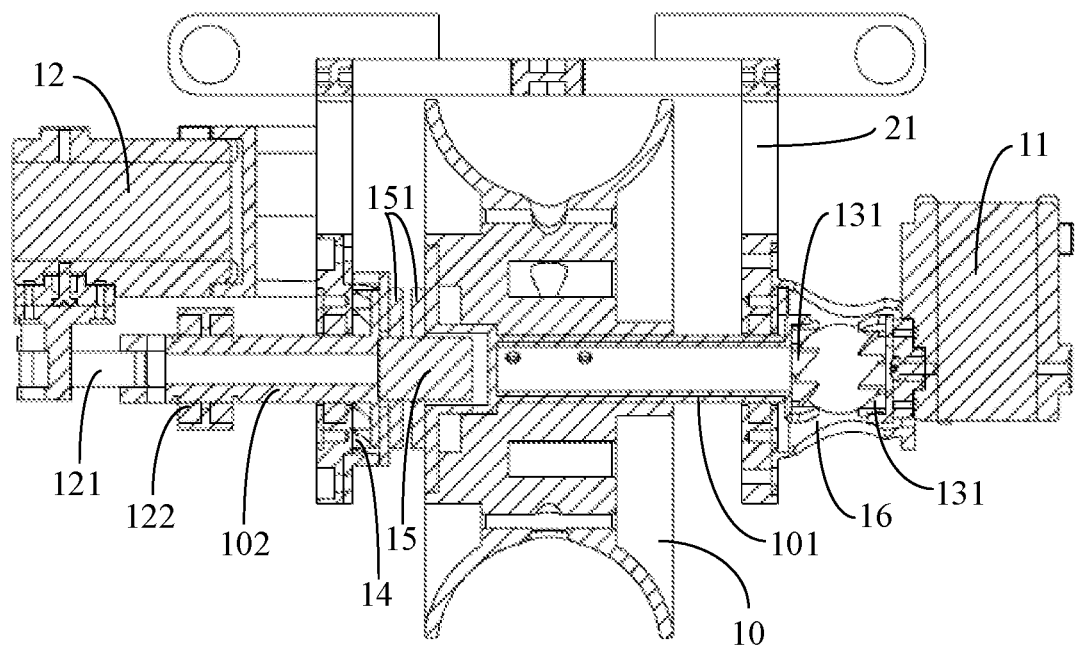
FIG. 7 is a cross sectional view showing that the cargo loading/unloading device for a drone of the preferred embodiment of the present invention in a third status.

With reference to FIGS. 6 and 7, it is noted that the second locking element 14 is, similarly, formed by two sets of slanted gears. Both gears are slanted in a predetermined angle such that when the two halves of gears are matched with one another, none of which are damaged. When the two sets of gears of the second locking element 14 are matched with one another, the free rotation of the electric reel 10 is terminated.

From the depiction of FIGS. 1-7, it is noted that the second driver 12 is securely connected to a linking rod 121 composed of two rotatably interconnected rods one of which is connected to a vertically downward driver shaft of the second driver 12 and the other one is rotatably connected to a C-shaped bearing mount 123 having a set of bearings 122 mounted therein as shown in FIG. 1. It is noted that a distal end of the second rotation axle 102 is connected to the bearing mount 123 such that when the second driver 12 is activated, the rotation of the linking rod 121 is able to drive the second rotation axle 102 to move linearly. That is, the movement of the linking rod 121 pushes or pulls the second rotation axle 102 to move.

With reference to FIGS. 3, 4, 5, 6 and 7, it is noted that when the second driver 12 is activated, the second rotation axle 102 is moved linearly and because the second rotation axle 102 is connected to the first rotation axle 101, movement of the second rotation axle 102 drives the first rotation axle 101 to move as well. Again, as the two sets of gears 131 of the first locking element 13 are respectively mounted on the first driver 11 and the distal end of the first rotation axle 101, the linear movement of the first rotation axle 101 activate/deactivate the locking effect of the first locking element 13, which allows the first driver 11 to selectively drive the first rotation axle 101 to rotate. Also, as the two sets of gears (not numbered) of the second locking element 14 are respectively mounted on the second rotation axle 102 and the side wall of the stability bracket 21, the linear movement of the second rotation axle 102 activate/deactivate the locking effect of the second locking element 14, which allows the second driver 12 to selectively drive the second rotation axle 102 to move. In the meantime, when the first and second rotation axles 101, 102 are both driven by the second driver 12 to move to a position where neither the first locking element 13 nor the second locking element 14 are activated, the first rotation axle 101 as well as the second rotation axle 102 is able to rotate freely. It is appreciated that when the first rotation axle 101 is able to rotate freely due to the weight of the cable wound around the electric reel 10, the cargo is being dropped to the designated location.

Therefore, it is shown in FIGS. 1 and 3 that when the first locking element 13 is in a locked status due to the drive from the second driver 12 to the second rotation axle 102 and the first rotation axle 101 (the second locking element is disengaged), the first driver 11 is able to drive the first rotation axle 101 to rotate. As the first rotation axle 101 is securely connected to the electric reel 10 and the two sets of gears 131 are securely connected to one another, rotation of the electric reel 10 commences a cable retrieving process. If neither the first locking element 13 nor the second locking element 14 is energized, the electric reel 10 starts a cable releasing process. When the second rotation axle 102 is pulled backward by the second driver 12 to allow the two sets of gears of the second locking element 14 to engage with one another, the electric reel 10 stops cable releasing process. Also, it is to be noted that at the time when the second locking element 14 is energized, it is the time that the electric reel 10 is releasing the cable (not shown) so that when the second locking element 14 is energized, the impact when the two sets of gears of the second locking element 14 are interconnected is huge and may damage the teeth of the gears after a period of time.

Figure 8:
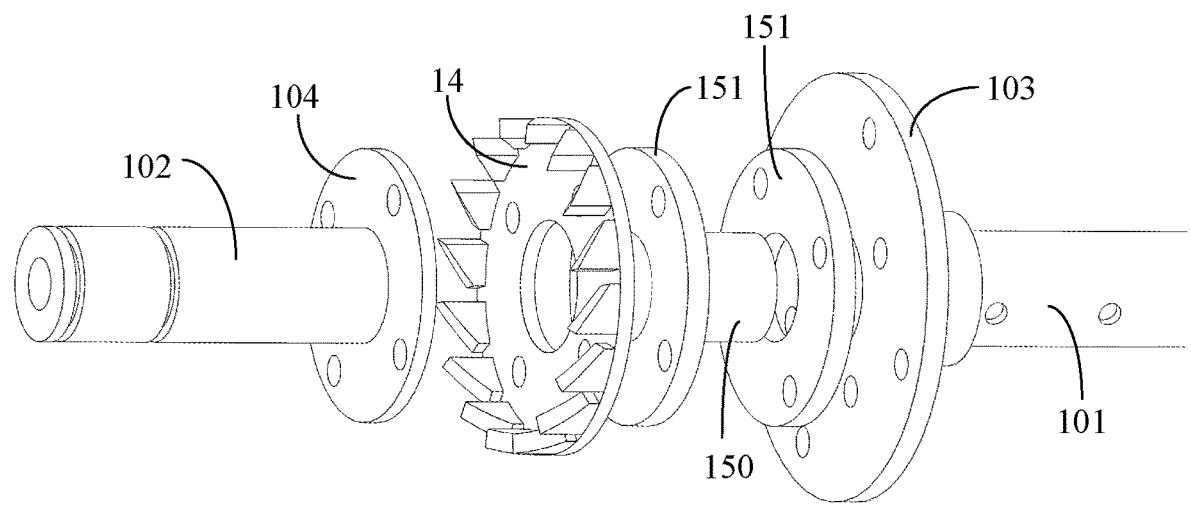
FIG. 8 is an exploded perspective view showing the connection between a first rotation axle and a second rotation axle.
Figure 9:
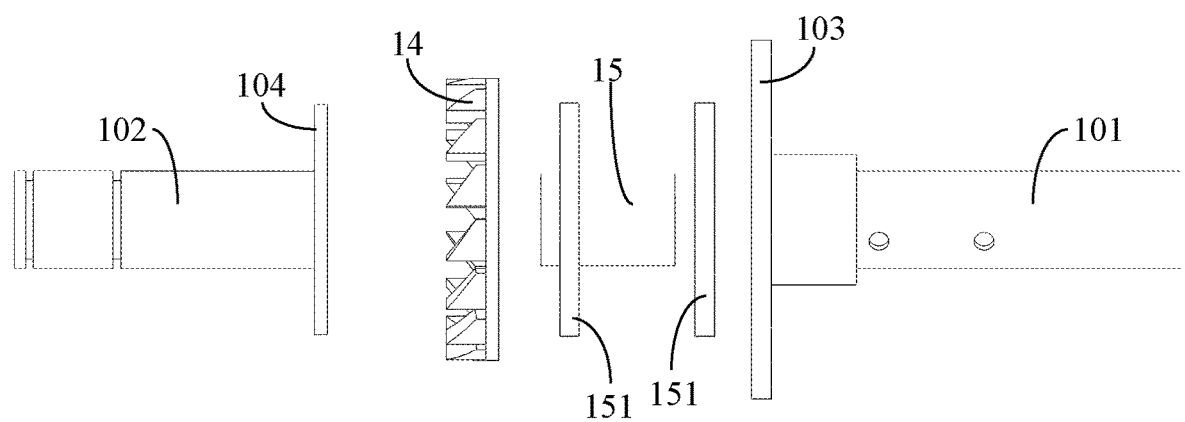
FIG. 9 is an exploded side plan view showing the connection between the first rotation axle and the second rotation axle.

To avoid the damage to the teeth of the two sets of gears of the second locking element 14, a buffer 15 is provided as shown in FIGS. 8 and 9. The buffer 15 has a first disk 103 formed on a distal end of the first rotation axle 101, two connection disks 151 firmly and respectively provided on a side of the first disk 103 and a side of one set of the gear of the second locking element 14, a bar 150 formed between the two connection disks 151 and a second disk 104 firmly formed on a distal end of the second rotation axle 102 to be surrounded by the teeth of the one set of gear of the second locking element 14. After the connection disks 151 are firmly and respectively engaged with the first disk 103 and the second disk 104, the rigid connection among the elements mentioned above ensures that the rotation of the first rotation axle 101 drives the second rotation axle 102 to rotate and vice versa. The buffer 15 used in the preferred embodiment is a damper to provide a torque absorption by the bar 150 so that when the second locking element 14 is energized, i.e., the two sets of gears of the second locking element 14 are engaged with one another, the torque absorption effect by the buffer 15 provides a clearance for the two sets of gears of the second locking element 14 to prevent any damage to the gears of the second locking element 14.

Figure 10:
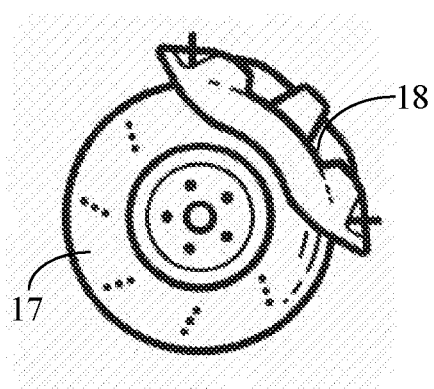
FIG. 10 is a schematic side plan view showing alternative choice for the buffer of the preferred embodiment of the present invention.

With reference to FIG. 10, the buffer 15 may adopt another mechanism to achieve the same effect. The buffer 15 in this preferred embodiment includes a brake disc 17 mounted on either the first rotation axle 101 or the second rotation axle 102 and a brake shoe 18 mounted on the side wall of the stability bracket 21. When the second driver 12 is energized to pull or push (depending on the design choice) the second rotation axle 102 to engage the second locking element 14, the brake shoe 18 engages the brake disc 17 to provide a buffer effect to the second locking element 14 when the two sets of gears are engaged with one another. Other buffer embodiment may be adopted to slow down the rotation of the second rotation axle 102, such as an electromagnetic driver directly mounted on either the first rotation axle 101 or the second rotation axle 102. It is noted that the bar 150 may be made of a metal, plastic, rubber of any suitable material or may be made of a spring, so long as the bar 150 is able to provide a buffer to the second locking element 14. It is also noted that the buffer may be a combination of an electromagnetic buffer having an axle selectively connected to either the first rotation axle or the second axle so that when the buffering effect is required, the electromagnetic force is delivered to stop rotation of the reel. The buffer may also be a spring to absorb the rotation force from the reel when required. Another embodiment to reduce damage to the cargo is to add a parachute to the cargo so that when the cargo (payload of the drone or a flying object) is descending, the parachute may dramatically reduce the descending speed and prevent the cargo from damage of any kind. Another method of protecting the cargo from damage is to use shock absorbing material having elasticity such as rubber situated between the driver, the motor, and the rotation axel to absorb the impact when the rotation axel is linearly moved or the shock absorbing material is used to package the content of the cargo so that when the cargo hits the ground the content of the cargo is protected.

Operational procedure of the preferred embodiment of the present invention is provided as follows.

With reference to FIGS. 1-3, when rewind of the cable is necessary, the second driver 14 is energized to push the second rotation axle 102 as well as the first rotation axle 101 to engage the two sets of gears of the first locking element 13. After the two sets of gears of the first locking element 13 are engaged with one another, the first driver 11 is energized to drive the first rotation axle 101 to start rewinding of the cable.

Figure 5:
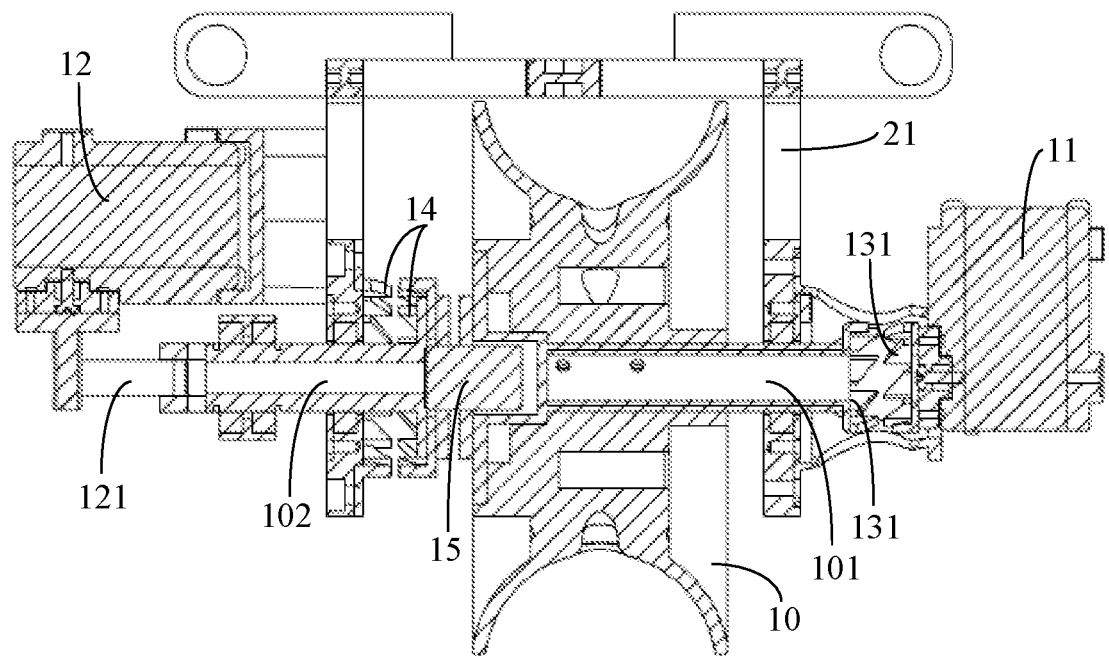
FIG. 5 is a cross sectional view of the cargo loading/unloading device for a drone of the preferred embodiment of the present invention in the second status.

With reference to FIGS. 4 and 5, when releasing the cable is necessary, the second driver 12 is energized to drive the second rotation axle 102 as well as the first rotation axle 101 to disengage the two sets of gears of the first locking element 13. Also, the second locking element 14 is not engaged. At this time, since both the first locking element 13 and the second locking element 14 are not engaged, the electric reel 10 is able to rotate freely. As the cargo is attached to the cable, due to gravity effect, the cable is released to unload the cargo.

With reference to FIGS. 6 and 7, after the cargo is reached to the ground or the cable is released enough, the second driver 14 is energized to pull (or push depending on the design choice) the second rotation axle 102 to engage the two sets of gears of the second locking element 14. Meanwhile, the buffer 15 starts functioning to provide a buffering effect to the second locking element 14 to prevent damage to the two sets of gears of the second locking element 14.

In sum, it is noted that when the first driver 11 is functioning and the first locking element 13 is engaged, the electric reel 10 starts rewinding the cable. When both the first locking element 13 and the second locking element 14 are not engaged, the electric reel 10 is able to rotate free to release the cable (the cargo). However, when the second locking element 14 starts the engagement to terminate the cable releasing process, the buffer 15 provides a torque absorption effect to the rotation of the second rotation axle 102 to prevent damage to the teeth of the second locking element 14.

Furthermore, it is appreciated from the design of the preferred embodiment of the present invention that the drone cargo loading/unloading device is able to achieve the following effects:

Safety

Due to the existence of the buffer, any undesignated pull to the cable may still not be prevented, but the mechanism of the device of the preferred embodiment of the present invention is protected.

Reduced Noise

The higher the drone is, the less noise the drone creates to the people on the ground.

Although the disclosure has been described in connection with the embodiments shown in the accompanying drawings, a person having ordinary skill in the art can make various modifications to the disclosure based on the above descriptions. Therefore, some details of the embodiment should not be construed to restrict the disclosure. The scope of the disclosure is limited by the accompanying claims.

What is claimed is:

1. A drone loading/unloading device comprising:
an reel selectively movable for releasing/winding a cable adapted to be wound around the electric reel;
a driver operably connected to the electric reel to selectively drive the reel to reciprocally move from a locked position and an unlocked position; and
a second driver selectively connected to the reel to drive the reel to move linearly to optionally position the reel at the first position to allow the reel to engage with the driver and at the second position to allow the reel to release the cable; and
a buffer mounted between the second driver and the reel to provide buffering effect to the electric reel when moved from an unlocked position to a locked position, wherein the reel is movably positioned between a first position where the driver drives the reel to retrieve the cable and a second position where the reel is disengaged with the driver to allow the reel to rotate freely so as to release the cable.

2. The device as claimed in claim 1 further comprising a first rotation axle extending through the reel, a first driver operably connected to the first rotation axle to selectively drive the first rotation axle as well as the reel to rotate and a first locking element mounted between a free end of the first rotation axle and a side of the driver to prevent the reel from rotation when the reel is at the first position.

3. The device as claimed in claim 2, wherein a sleeve is provided to surround the first locking element and has a guiding passage defined therein to guide engagement between two halves of teeth of the first locking element.

4. The device as claimed in claim 2 further comprising a second rotation axle operably connected to the driver and the first rotation axle via the buffer.

5. The device as claimed in claim 4 further comprising a stability bracket mounted on the first rotation axle and the second rotation axle to provide stability to the rotation of both the first rotation axle and the second rotation axle.

6. The device as claimed in claim 5, wherein a second locking element is composed of two sets of gears respectively mounted on the second rotation axle and a side of the stability bracket so that when the second rotation axle as well as the first rotation axle is moved from the second position to the first position, engagement impact between the two sets of gears of the second locking element is reduced by the buffer.

7. The device as claimed in claim 2, wherein the first locking element is composed of two sets of gears selectively engaged with one another by the driver and the two sets of gears are respectively mounted on a side of the first driver and a free end of the first rotation axle.

8. The device as claimed in claim 6, wherein the first locking element is composed of two sets of gears selectively engaged with one another by the driver and the two sets of gears are respectively mounted on a side of the first driver and a free end of the first rotation axle.

9. The device as claimed in claim 6, wherein the driver moves the second rotation axle as well as the first rotation axle to selectively engage the two sets of gears of the first locking element to start rotation of the reel for cable retrieving when the reel is at the first position.

10. The device as claimed in claim 5, wherein the driver moves the first rotation axle as well as the second rotation axle to selectively engage one another the two sets of gears of the second locking element to stop free rotation of the reel when the reel is at the first position.

11. The device as claimed in claim 8, wherein the first position and the second position of the reel is selected between the two sets of gears of the first locking element and the two sets of gears of the second locking element.

12. The device as claimed in claim 6, wherein teeth of the two sets of gears of the first locking element and of the two sets of gear of the second locking element are slanted such that when the two sets of gears of the first locking element and of the second locking element are engaged with one another, damage to the teeth is minimized.

13. The device as claimed in claim 2 wherein the buffer is selected from a group consisting of an electromagnetic buffer, a rubber and a spring.

* * * * *